US008561738B2

(12) United States Patent
Charnesky et al.

(10) Patent No.: US 8,561,738 B2
(45) Date of Patent: Oct. 22, 2013

(54) COMPOUND SHUTTER SYSTEM WITH INDEPENDENT AND NON-SEQUENTIAL OPERATION

(75) Inventors: Scott P. Charnesky, Birmingham, MI (US); Paul W. Alexander, Ypsilanti, MI (US); Nilesh D. Mankame, Ann Arbor, MI (US); Alan L. Browne, Grosse Pointe, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 12/956,895

(22) Filed: Nov. 30, 2010

(65) Prior Publication Data

US 2012/0132474 A1    May 31, 2012

(51) Int. Cl.
    *B60K 11/08*    (2006.01)
(52) U.S. Cl.
    USPC ............................ 180/68.1; 180/68.3
(58) Field of Classification Search
    USPC .............................. 180/68.1, 68.3
    See application file for complete search history.

(56) References Cited

U.S. PATENT DOCUMENTS

| | | | |
|---|---|---|---|
| 3,759,054 A | 9/1973 | Graber | |
| 4,410,032 A * | 10/1983 | Mori | 165/44 |
| 4,753,288 A * | 6/1988 | Harvey | 165/98 |
| 6,854,544 B2 * | 2/2005 | Vide | 180/68.6 |
| 7,717,208 B2 * | 5/2010 | Knauer | 180/68.6 |
| 8,091,668 B2 * | 1/2012 | Amano et al. | 180/68.1 |
| 8,181,727 B2 * | 5/2012 | Ritz et al. | 180/68.1 |
| 8,281,754 B2 * | 10/2012 | Saida et al. | 123/41.04 |
| 8,292,014 B2 * | 10/2012 | Sugiyama | 180/68.1 |
| 2006/0095178 A1 * | 5/2006 | Guilfoyle et al. | 701/36 |
| 2008/0178526 A1 | 7/2008 | Browne et al. | |
| 2010/0071977 A1 * | 3/2010 | Ritz et al. | 180/68.1 |
| 2010/0147611 A1 * | 6/2010 | Amano et al. | 180/68.1 |
| 2010/0243351 A1 * | 9/2010 | Sakai | 180/68.1 |
| 2010/0243352 A1 * | 9/2010 | Watanabe et al. | 180/68.1 |
| 2010/0282533 A1 * | 11/2010 | Sugiyama | 180/68.1 |
| 2011/0120395 A1 * | 5/2011 | Kim | 123/41.05 |
| 2011/0226541 A1 * | 9/2011 | Hori et al. | 180/68.1 |
| 2012/0060776 A1 * | 3/2012 | Charnesky et al. | 123/41.05 |
| 2012/0132474 A1 * | 5/2012 | Charnesky et al. | 180/68.1 |
| 2012/0270490 A1 * | 10/2012 | Turner et al. | 454/75 |
| 2012/0312611 A1 * | 12/2012 | Van Buren et al. | 180/68.1 |

* cited by examiner

*Primary Examiner* — Jeffrey J Restifo
(74) *Attorney, Agent, or Firm* — Quinn Law Group, PLLC

(57) ABSTRACT

A compound shutter system includes a plurality of shutter assemblies. Each of the shutter assemblies has at least one louver operable to selectively open and close the respective shutter assembly. The compound shutter system additionally includes a mechanism operatively connected to each of the plurality of shutter assemblies. The mechanism is also configured to actuate each of the shutter assemblies independently and non-sequentially relative to each other. A vehicle employing the compound shutter system is also disclosed.

20 Claims, 4 Drawing Sheets

COMPOUND SHUTTER SYSTEM WITH INDEPENDENT AND NON-SEQUENTIAL OPERATION

TECHNICAL FIELD

The invention relates to a compound shutter system characterized by independent and non-sequential operation.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY

A compound shutter system includes a plurality of shutter assemblies. Each of the shutter assemblies has at least one louver operable to selectively open and close the respective shutter assembly. The compound shutter system additionally includes a mechanism operatively connected to each of the plurality of shutter assemblies. The mechanism is also configured to actuate each of the shutter assemblies independently and non-sequentially relative to each other.

The plurality of shutter assemblies may include a first shutter and a second shutter assembly, wherein the second shutter assembly is disposed apart from the first shutter assembly. The mechanism may include a clutch operatively connected to each of the first shutter assembly and the second shutter assembly and a motor operatively connected to the clutch. The clutch may be configured to operate the motor in a first mode of actuating the first shutter assembly and the second shutter assembly, a second mode of actuating the first shutter assembly, and a third mode of actuating the second shutter assembly. The clutch may employ a shape memory material selectively energized to operate the motor in one of the first, second, and third modes. The mechanism may include a first drive element configured to operate the first shutter and a second drive element configured to operate the second shutter assembly. Each of the first drive element and the second drive element may be one of a push-pull cable and a torque-type cable.

The shutter system may additionally include a controller configured to regulate the mechanism. The controller may be configured to regulate the mechanism to control an airstream in a vehicle through a first grille opening and through a second grille opening that is disposed remotely from the first grille opening. In such a configuration, the first shutter assembly may be disposed in the first grille opening and the second shutter assembly may be disposed in the second grille opening. Such a vehicle may include an internal combustion engine, while the controller may be configured to regulate the mechanism according to a load on the engine. The first grille opening may be disposed apart from the second grille opening.

The engine may be cooled by a fluid circulated through a heat exchanger, and the vehicle may include a sensor adapted to sense a temperature of the fluid and configured to communicate the temperature to the controller. The controller may be configured to regulate the mechanism to cool the fluid circulated through the heat exchanger according to the sensed temperature of the fluid.

The above features and advantages and other features and advantages of the present invention are readily apparent from the following detailed description of the best modes for carrying out the invention when taken in connection with the accompanying drawings.

DETAILED DESCRIPTION

Figure 1:
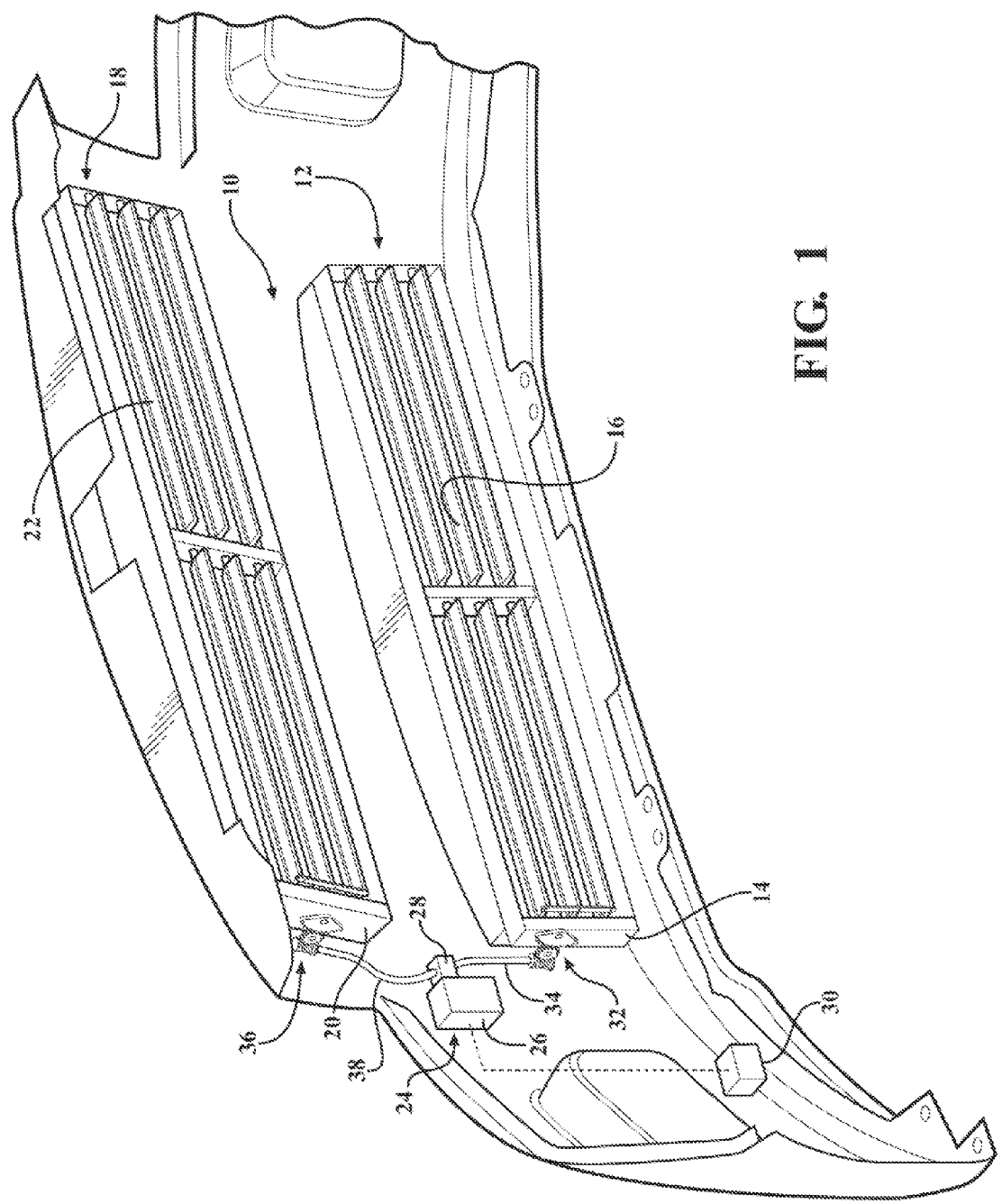
FIG. 1 is a partial perspective view of a compound shutter system according to a first embodiment.

Referring to the drawings, wherein like reference numbers refer to like components, FIG. 1 shows a compound shutter system 10 according to a first embodiment. As shown, the shutter assembly 12 is arranged in a vehicle 60, which will be described in detail elsewhere in the text with respect to FIG. 6. The shutter system 10 includes a first shutter assembly 12 and a second shutter assembly 18. The first shutter assembly 12 includes a rigid frame 14 and a first set of louvers 16 operable to selectively open and close the first shutter assembly. Although the shutter system 10 is depicted as specifically having first and second shutter assemblies 12 and 18, nothing precludes the system from employing a greater number of shutter assemblies.

The second shutter assembly 18 includes a rigid frame 20 and a second set of louvers 22 operable to selectively open and close the second shutter assembly. Similar to the louvers 16, the louvers 22 may be rotated through a range between and inclusive of a fully opened and a fully closed position of the shutter assembly 18. Although louvers 16 and 22 are shown as rotatable panels, the term "louvers" may include any combination of panels or slats moveable in any manner with respect to each other and to their respective frames 14, 20. As shown in FIG. 1, the second shutter assembly 18 is disposed separately and remotely from the first shutter assembly 12. The second shutter assembly 18 may also be separate from but disposed adjacent to the first shutter assembly 12 to cover a single large grille opening (not shown). A mechanism 24 is operatively connected to the first shutter assembly 12 and to the second shutter assembly 18.

The mechanism 24 is configured to actuate first and second shutter assemblies 12, 18 independently and non-sequentially relative to each other. The mechanism 24 is configured to operate the first and second shutter assemblies by rotating the louvers 16 and 22, respectively, through a range between and inclusive of a fully opened and a fully closed position. As shown, the mechanism 24 includes an electric motor 26 and a clutch 28. The clutch 28 is configured to operate the motor 26 in a first mode of actuating the first shutter assembly 12 and the second shutter assembly 18, a second mode of actuating solely the first shutter assembly, and a third mode of actuating solely the second shutter assembly. As such, the electric motor 26 is enabled via the clutch 28 to actuate the first shutter assembly 12 and to actuate the second shutter assembly 18 either simultaneously or separately. The operation of the clutch 28 may be regulated by a controller 30 arranged in electronic communication with the mechanism 24. An exemplary configuration of the clutch 28 is depicted in FIGS. 2-3 and is described in greater detail below.

As shown in FIG. 1, the mechanism 24 also includes a gear drive arrangement 32 that is operatively connected to the first shutter assembly 12. The gear drive arrangement 32 is employed to receive external drive from a drive element 34 and convert such external drive to rotation of the louvers 16. The mechanism 24 also includes a gear drive arrangement 36 that is operatively connected to the second shutter assembly 18. The gear drive arrangement 36 is employed to receive external drive from a drive element 38 and convert such external drive to rotation of the louvers 22. As shown in FIG. 1, each of the drive elements 34 and 38 may be a torque-type cable, i.e., a cable that is configured to accept torsional loads without significant twist, to thereby transmit drive from the motor 26 to the first shutter assembly 12 and/or the second shutter assembly 18. Such a torque-type cable may be produced from any suitable material or a combination of materials, and a flat-wrap cable conduit may also be employed.

Figure 2:
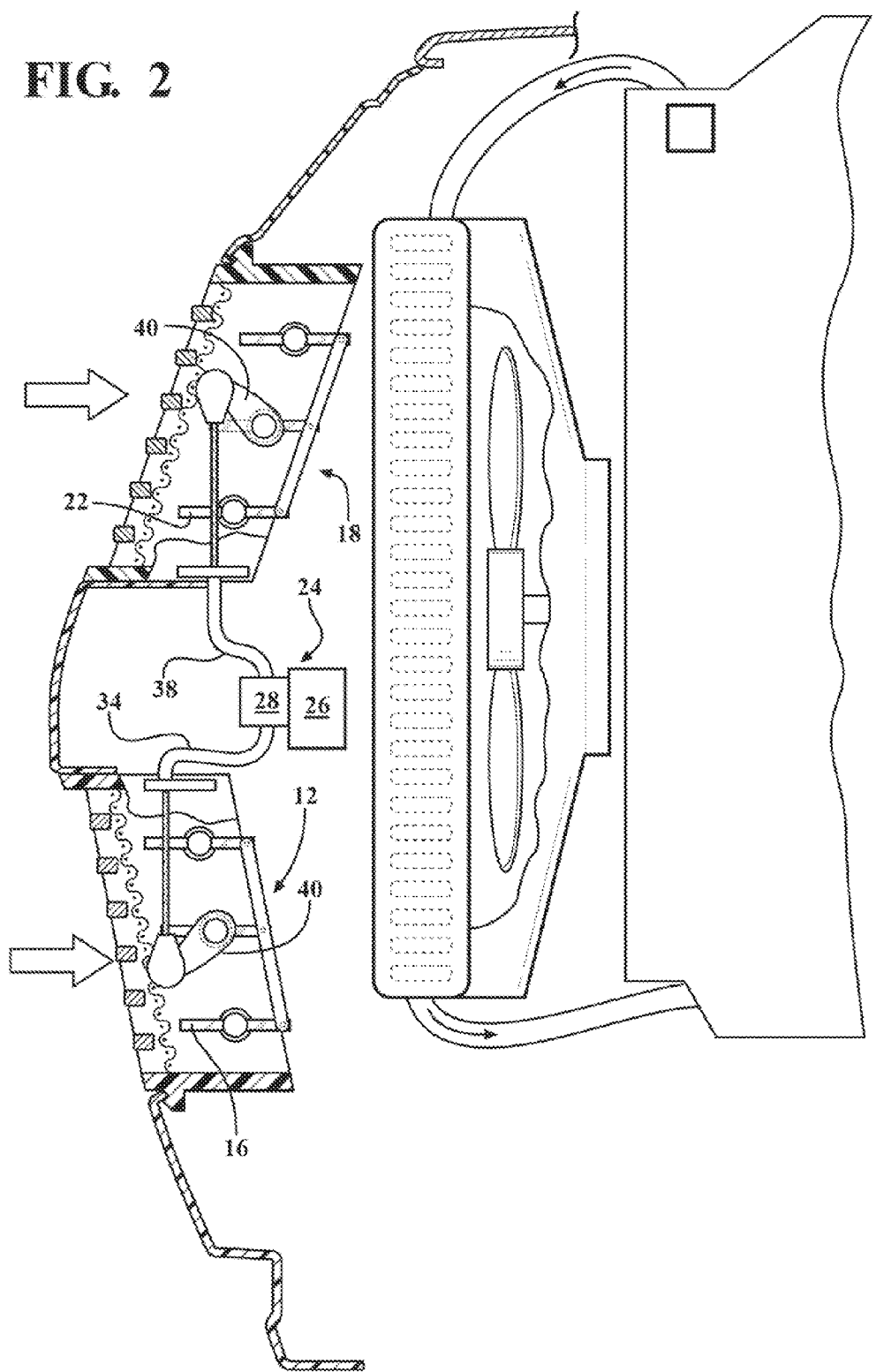
FIG. 2 is a partial perspective view of the compound shutter system according to a second embodiment.
Figure 3:
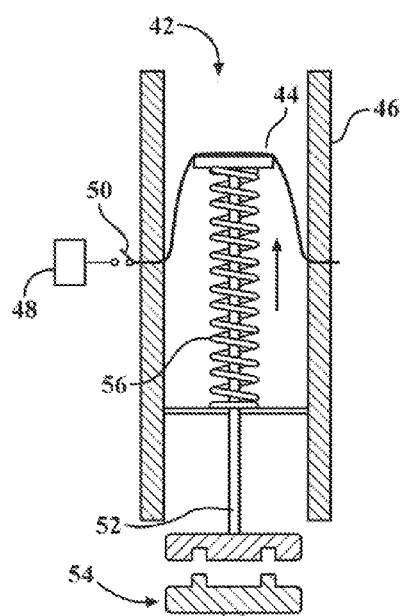
FIG. 3 is an exemplary schematic view of a clutch used to used to operate a motor for actuating the compound shutter system, the clutch shown in a non-energized state.

As shown in FIG. 2, each of the drive elements 34 and 38 may also be a push-pull type cable, i.e., a cable that is configured to selectively push and pull via a cam 40 or a lever arrangement (not shown) to rotate the louvers 16 and/or 22 when the first shutter assembly 12 and/or the second shutter assembly 18 is operated by the motor 26. As shown in both cases of FIGS. 1 and 2, the drive elements 34 and 38 permit the first and second shutter assemblies 12 and 18 to be located remotely from each other and be actuated by the motor 26. Such capability is especially beneficial when the first and second shutter assemblies 12 and 18 are physically separated by other structures and/or devices that may be packaged in the vehicle 60 (shown in FIG. 5).

Figure 4:
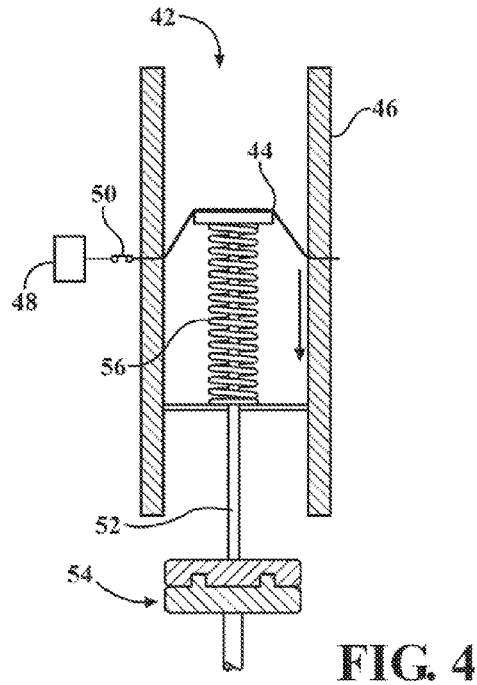
FIG. 4 is an exemplary schematic view of the clutch of FIG. 3 in an energized state.
Figure 5:
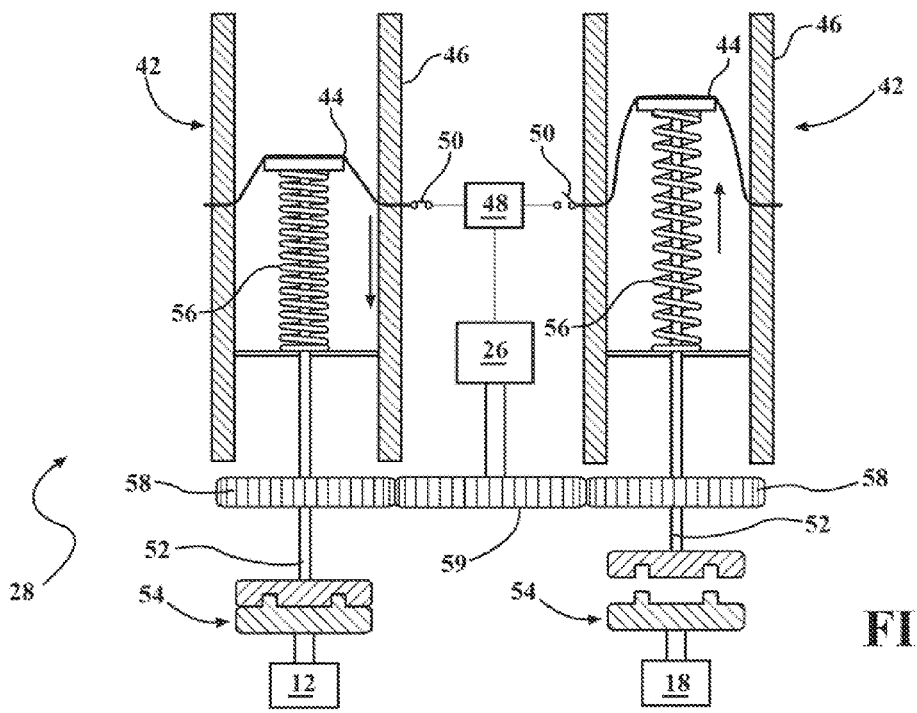
FIG. 5 is an exemplary schematic view of the clutch having two actuators of the type shown in FIGS. 4-5 for actuating the compound shutter system shown in FIGS. 1-2.
Figure 6:
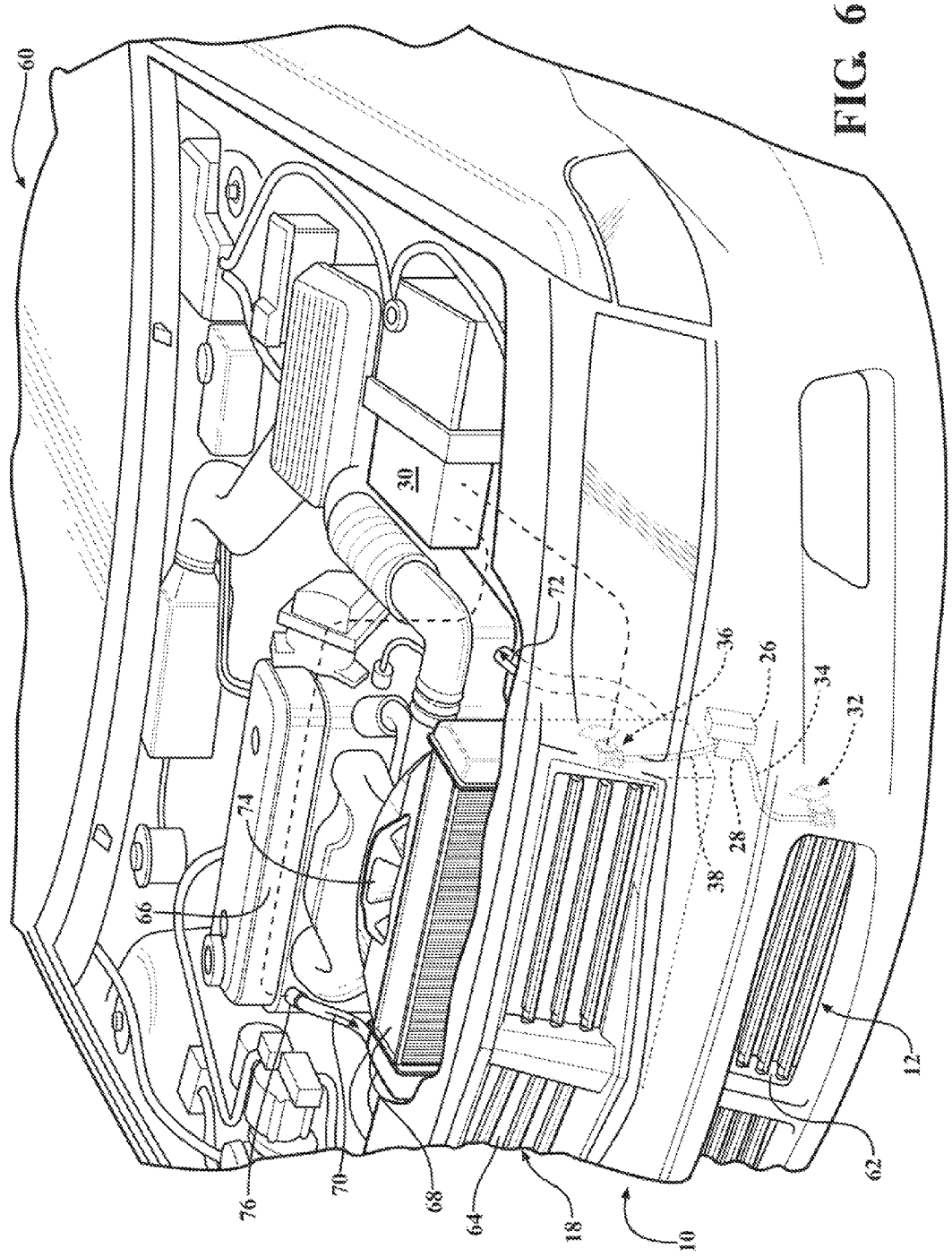
FIG. 6 is a partial perspective view of a vehicle having the shutter system shown in FIGS. 1 and 2.

As seen in FIGS. 1 and 2, a clutch 28 is operatively connected to each of the motor 26, the first shutter assembly 12, and the second shutter assembly 18. The clutch 28 is configured to operate the motor 26 in one of a first mode of actuating the first shutter assembly 12 and actuating the second shutter assembly 18, a second mode of solely actuating the first shutter assembly, and a third mode of solely actuating the second shutter assembly. As such, the motor 26 is enabled via the clutch 28 to actuate the first shutter assembly 12 and the second shutter assembly 18 either simultaneously or separately, wherein such selective actuation may be regulated by the controller 30. An exemplary configuration of the clutch 28 is depicted in FIGS. 3-4, where the clutch is shown as having one actuator 42 for each of the first shutter assembly 12 and the second shutter assembly 18. As shown in FIGS. 4-6, each actuator 42 employs an active material member 44.

As shown in FIGS. 3-4, the active material member 44 is configured as a continuous wire of constant cross-section from a shape memory alloy (SMA) that is secured inside a housing 46 of a single actuator 42. The active material member 44 may be selectively energized via an electrical current provided by the energy source 48 through a switch 50. As shown in FIG. 3, when the active material member 44 is in its original shape, a shaft 52 operatively connected to a coupling device such as a dog clutch 54 is in a starting position and the dog clutch is disengaged. The active material member 44 is configured to undergo a dimensional change and thus translate a shaft 52 to engage the dog clutch 54 when the active material member is subjected to the electrical current, as shown in FIG. 4. After the current is switched off, a biasing spring 56 pulls the shaft 52 back to the starting position, disengages the dog clutch 54, and assists the active material member 44 back to its original shape and/or dimension.

A plurality of actuators 42 may be combined to form the clutch 28. The clutch 28 may thus be used to drive multiple outputs or actuate multiple components, such as the first and second shutter assemblies 12, 18, as well as an additional number of shutter assemblies that may be included in the shutter system 10. For example, as shown in FIG. 5, two separate actuators 42 may be employed to drive two separate shafts 52 to engage two separate dog clutches 54. Although only two actuators 42 are shown herein, as many actuators as required to drive any number of outputs may be connected to the motor 26. As shown, each of two such actuators 42 is selectively energized via energy source 48 through a separate switch 50 whose closure is regulated by the controller 30. Additionally, each of the two such actuators 42 is connected to the motor 26 via a separate gear 58, wherein the separate gears 58 may have identical tooth counts and diameters or be dissimilar in that regard.

Motor 26 is operatively connected to a gear 59. Accordingly, each gear 58 is driven by the motor 26 via the gear 59. Thus, when the active material member 44 of one of the two actuators 42 is energized, that particular active material member engages one dog clutch 54 to actuate one of the first and second shutter assemblies 12 and 18. Similarly, when the active material member 44 of the other of the two actuators 42 is energized, that active material member engages the other dog clutch 54 to the other of the first and second shutter assemblies 12 and 18. Accordingly, the first and second shutter assemblies 12 and 18 may be actuated either simultaneously or separately by the motor 26 via the clutch 28.

Although the clutch 28 is depicted as having multiple actuators 42 with active material members 61, any appropriate mechanism for actuating the first and/or second shutter assemblies 12 and 18 by the motor 26, such as a single or a plurality of electromechanical solenoids, may be used.

FIG. 6 depicts the shutter system 10 incorporated inside the vehicle 60 which includes a first grille opening 62 and a second grille opening 64 arranged to provide air flow to various vehicle systems and components. Although the vehicle 60 is depicted as specifically having the first and second grille openings 62 and 64, nothing precludes the vehicle from employing a greater number of grille openings with each opening housing a separate shutter assembly. As shown, the shutter assembly 12 is disposed in the first grille opening 62 and the shutter assembly 18 is disposed in the second grille opening 64. The positioning of the shutter assemblies 12 and 18 may also be switched, such that the shutter assembly 18 is disposed in the first grille opening 62 and the shutter assembly 12 is disposed in the second grille opening 64. Both grille openings 62 and 64 are positioned at the front of the vehicle 60. The vehicle 60 includes an internal combustion engine 66. Although not specifically shown, the vehicle 60 may also be configured as a hybrid electric type that includes one or more motor/generators, various energy storage devices, and/or a fuel cell. As such, the grille openings 62 and 64 may also provide air flow to such other components. Also included is an air-to-fluid heat exchanger 68, i.e., a radiator, for circulating a cooling fluid, shown by arrows 70 and 72, such as water or a specially formulated coolant, for cooling the engine 66. The heat exchanger 68 is positioned behind the grille opening 62 and behind the shutter system 10, such that the heat exchanger may be shielded from various road- and air-borne debris. The heat exchanger 68 may also be positioned in any other location, such as behind a passenger compartment, if, for example, the vehicle has, a rear or a mid-engine configuration, as understood by those skilled in the art.

A fan 74 is positioned behind the heat exchanger 68. The fan 74 may be driven directly by engine 66, either electrically or mechanically. The vehicle 60 also includes the controller 30, which may be an engine controller or a separate control unit, configured to regulate the mechanism 24 for selecting the desired position of the shutter system 10. The controller 30 may also be configured to operate the fan 74, if the fan is electrically driven, and a thermostat (not shown) that is configured to regulate the circulation of coolant, as understood by those skilled in the art.

The vehicle 60 additionally includes a coolant sensor 76 configured to sense a temperature of the coolant. The controller 30 is programmed to regulate the mechanism 24 according to the load on the engine 66 and, correspondingly, on the temperature of the coolant sensed by the sensor 76. The temperature of the coolant is increased due to the heat produced by the engine 66 under load. Typically, a load on the engine is dependent on operating conditions imposed on the vehicle 60, such as going up a hill and/or pulling a trailer. The load on the engine 66 generally drives up internal temperature of the engine, which in turn necessitates cooling of the engine for desired performance and reliability.

The coolant is routed inside the engine 66 in order to most effectively remove heat from critical engine components, such as bearings (not shown, but known by those skilled in the art). Typically, the coolant is continuously circulated by a fluid pump (not shown) from the engine 66 to the heat exchanger 68. In a moving vehicle, an airstream at ambient temperature and traveling at a certain velocity with respect to the vehicle penetrates the vehicle's grille opening 62. When the shutter system 10 is open, the airstream penetrates the shutter system plane before coming into contact with the heat exchanger 68. As the airstream reaches the heat exchanger 68, the coolant temperature inside the heat exchanger is reduced before the coolant is returned to the engine 66, to thereby cool the engine.

When the shutter system 10 is fully closed, the louvers 16 and 22 provide blockage of the airstream at the grille openings 62 and 64, respectively. When the shutter system 10 is fully opened, as shown in FIG. 6, the louvers 16 and 22 are rotated to a position parallel to the airstream seeking to penetrate the shutter system plane. Thus, a fully opened shutter system 10 is configured to permit a generally unfettered passage of such a stream through the louver plane. The shutter system 10 may also be regulated by the controller 30 to variably restrict access of the oncoming airstream to the heat exchanger 68, by providing independent and non-sequential operation of the first shutter assembly 12 and the second shutter assembly 18 via the motor 26 and the clutch 28.

An intermediate position may be selected for the first shutter assembly 12 and/or the second shutter assembly 18, where the respective louvers 16 and/or 22 are partially closed. Such ability to provide independent and non-sequential operation of the first shutter assembly 12 and the second shutter assembly 18 permits finer control of the amount of airstream received by the heat exchanger 68. An appropriate position of the louvers 16 and 22 is selected independently and non-sequentially by the controller 30 according to a programmed algorithm to thereby affect the desired cooling of the engine 66, as well as to generate the most favorable aerodynamic performance of the vehicle 60.

While the best modes for carrying out the invention have been described in detail, those familiar with the art to which this invention relates will recognize various alternative designs and embodiments for practicing the invention within the scope of the appended claims.

The invention claimed is:

1. A compound shutter system comprising:
   a plurality of shutter assemblies disposed apart from each other, each of the shutter assemblies having at least one louver operable to selectively open and close the respective shutter assembly; and
   a mechanism having a clutch operatively connected to each of the plurality of shutter assemblies, and a motor operatively connected to the clutch and configured to actuate each of the shutter assemblies independently and non-sequentially relative to each other.

2. The shutter system of claim 1, wherein:
   the plurality of shutter assemblies includes a first shutter assembly and a second shutter assembly; and
   the clutch is configured to operate the motor in a first mode of actuating the first shutter assembly and the second shutter assembly, a second mode of actuating the first shutter assembly, and a third mode of actuating the second shutter assembly.

3. The shutter system of claim 2, wherein the clutch employs a shape memory material which is selectively energized to operate the motor in one of the first, the second, and the third mode.

4. The shutter system of claim 2, wherein when the mechanism includes a first drive element configured to operate the first shutter assembly and a second drive element configured to operate the second shutter assembly.

5. The shutter system of claim 4, wherein each of the first drive element and the second drive element is one of a push-pull cable and a torque-type cable.

6. The shutter system of claim 2, further comprising a controller configured to regulate the mechanism.

7. The shutter system of claim 6, wherein the controller regulates the mechanism to control an airstream in a vehicle through a first grille opening and through a second grille opening that is disposed remotely from the first grille opening, such that the first shutter assembly is disposed in the first grille opening and the second shutter assembly is disposed in the second grille opening.

8. The shutter system of claim 7, wherein the vehicle includes an internal combustion engine, and the controller is configured to regulate the mechanism according to a load on the engine.

9. The shutter system of claim 8, wherein the engine is cooled by a fluid circulated through a heat exchanger, and the vehicle includes a sensor adapted to sense a temperature of the fluid and configured to communicate the temperature to the controller.

10. The shutter system of claim 9, wherein the controller is configured to regulate the mechanism to cool the fluid circulated through the heat exchanger according to the sensed temperature of the fluid.

11. A vehicle comprising:
    an internal combustion engine cooled by a circulating fluid;
    a heat exchanger configured to cool the fluid via an airstream after the fluid cools the engine;

a plurality of grille openings disposed apart from each other, wherein each of the plurality of grille openings is positioned to permit the airstream to pass to the heat exchanger; and a compound shutter system for controlling an airstream through the plurality of grille openings, the shutter system including:

a plurality of shutter assemblies disposed apart from each other, each of the shutter assemblies having at least one louver operable to selectively open and close the respective shutter assembly; and a mechanism having a clutch operatively connected to each of the plurality of shutter assemblies, and a motor operatively connected to the clutch and configured to actuate each of the shutter assemblies independently and non-sequentially relative to each other.

12. The vehicle of claim 11, wherein the plurality of grille openings includes a first grille opening and a second grille opening, and wherein the plurality of shutter assemblies includes a first shutter assembly disposed in the first grille opening and a second shutter assembly disposed in the second grille opening.

13. The vehicle of claim 12, wherein the clutch is configured to operate the motor in a first mode of actuating the first shutter assembly and the second shutter assembly, a second mode of actuating the first shutter assembly, and a third mode of actuating the second shutter assembly.

14. The vehicle of claim 13, wherein the clutch employs a shape memory material selectively energized to operate the motor in one of the first, the second, and the third mode.

15. The vehicle of claim 13, wherein when the mechanism includes a first drive element configured to operate the first shutter assembly and a second drive element configured to operate the second shutter assembly.

16. The vehicle of claim 11, wherein each of the first drive element and the second drive element is one of a push-pull cable and a torque-type cable.

17. The vehicle of claim 11, further comprising a controller configured to regulate the mechanism.

18. The vehicle of claim 17, wherein the controller is configured to regulate the mechanism according to a load on the engine.

19. The vehicle of claim 18, wherein the engine is cooled by a fluid circulated through the heat exchanger, and wherein the vehicle includes a sensor which senses a temperature of the fluid and communicates the temperature to the controller.

20. The vehicle of claim 19, wherein the controller is operable for regulating the mechanism to cool the fluid circulated through the heat exchanger according to the sensed temperature of the fluid.

* * * * *